United States Patent
Kim et al.

(10) Patent No.: US 11,541,777 B2
(45) Date of Patent: Jan. 3, 2023

(54) SYSTEM AND METHOD FOR CONTROLLING VEHICLE THERMAL MANAGEMENT APPARATUS

(71) Applicants: Hyundai Motor Company, Seoul (KR); Kia Motors Corporation, Seoul (KR)

(72) Inventors: Jae Woong Kim, Hwaseong-Si (KR); So La Chung, Seoul (KR); Man Ju Oh, Yongin-si (KR); Sang Shin Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 756 days.

(21) Appl. No.: 16/530,246

(22) Filed: Aug. 2, 2019

(65) Prior Publication Data

US 2020/0262312 A1    Aug. 20, 2020

(30) Foreign Application Priority Data

Feb. 18, 2019    (KR) .......................... 10-2019-0018364

(51) Int. Cl.
*B60L 58/26* (2019.01)
*H01M 10/633* (2014.01)
*H01M 10/625* (2014.01)
*H01M 10/613* (2014.01)
*H01M 10/6568* (2014.01)
(Continued)

(52) U.S. Cl.
CPC ........... *B60L 58/26* (2019.02); *H01M 10/613* (2015.04); *H01M 10/625* (2015.04); *H01M 10/633* (2015.04); *H01M 10/6551* (2015.04); *H01M 10/6563* (2015.04); *H01M 10/6568* (2015.04); *B60L 2240/12* (2013.01); *B60L 2240/54* (2013.01); *B60L 2240/545* (2013.01);
(Continued)

(58) Field of Classification Search
CPC ............. H01M 10/613; H01M 10/625; H01M 10/633; H01M 10/6551; H01M 10/6563; H01M 10/6568; B60L 58/26
See application file for complete search history.

(56) References Cited

U.S. PATENT DOCUMENTS

2010/0212338 A1*  8/2010  Hermann ............ H01M 10/615
                                                           62/118

FOREIGN PATENT DOCUMENTS

| JP | 2016-115607 A | 6/2016 |
| KR | 10-1724958 B1 | 4/2017 |
| KR | 10-2018-0050994 A | 5/2018 |

* cited by examiner

*Primary Examiner* — Karie O'Neill Apicella
(74) *Attorney, Agent, or Firm* — Morgan, Lewis & Bockius LLP

(57) ABSTRACT

A system and method for controlling a vehicle thermal management apparatus, may include a component state unit of collecting a state of a vehicle component, a disturbance collection unit of collecting a state of a disturbance affecting thermal management of the vehicle component, a determination unit of calculating an amount of heat exchange between the vehicle component and a thermal management apparatus, which is required in the future, based on a past state value of the vehicle component collected through the component state unit and a past state value of the disturbance collected through the disturbance collection unit, and an operation unit of controlling operation of the thermal management apparatus based on the amount of heat exchange determined by the calculation unit.

13 Claims, 6 Drawing Sheets

(51) Int. Cl.
*H01M 10/6563* (2014.01)
*H01M 10/6551* (2014.01)

(52) U.S. Cl.
CPC ....... *B60L 2240/80* (2013.01); *B60Y 2200/91* (2013.01); *H01M 2220/20* (2013.01)

FIG. 3

| LPM / Fan RPM | 10 | 12 | 14 | 15 |
|---|---|---|---|---|
| 0 | 1 | 2 | 5 | |
| 1000 | 3 | 4 | 6 | |
| 1500 | | | | |
| 2000 | | | | |
| 2300 | | | | |

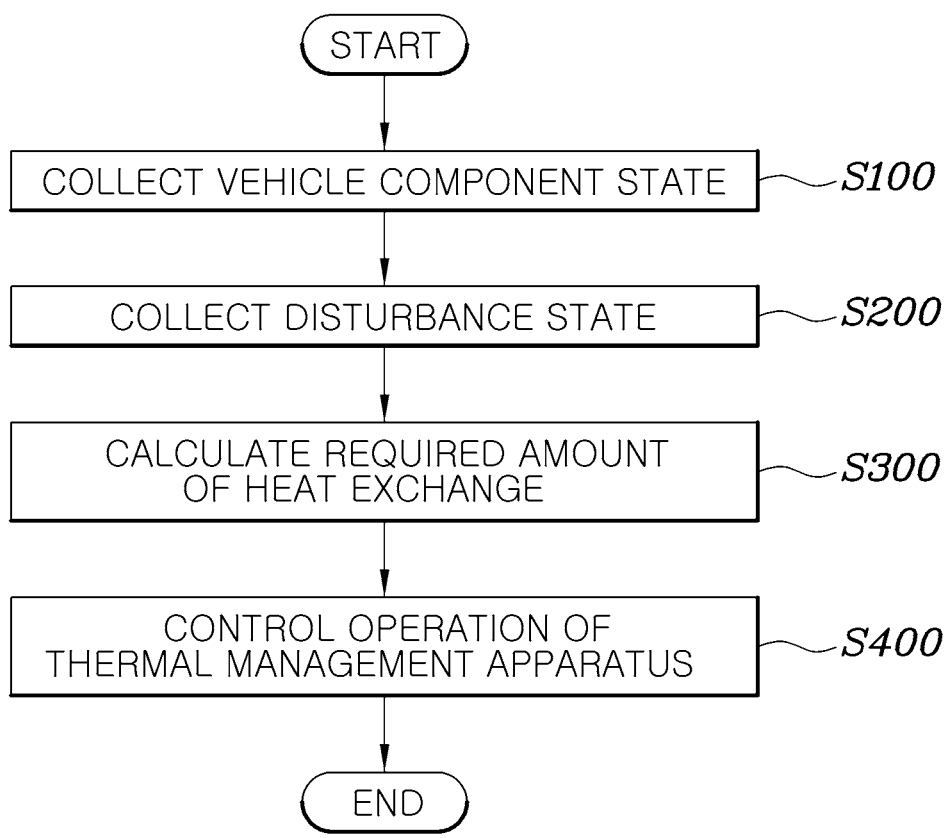

SYSTEM AND METHOD FOR CONTROLLING VEHICLE THERMAL MANAGEMENT APPARATUS

CROSS REFERENCE TO RELATED APPLICATION

The present application claims priority of Korean Patent Application No. 10-2019-0018364 filed on Feb. 18, 2019, the entire contents of which is incorporated herein for all purposes by this reference.

BACKGROUND OF THE INVENTION

Field of the Invention

The present invention relates to a system and method for controlling a vehicle thermal management apparatus, configured for satisfying a thermal management target for a vehicle component while minimizing power consumption by determining a required amount of heat exchange through states of a vehicle component and a disturbance by an optimal control technique and thus controlling a thermal management apparatus, rather than simply controlling the thermal management apparatus according to the temperature of the vehicle component by a fixed method.

Description of Related Art

Hybrid or electric vehicles have been developed and commercialized due to environmental problems in recent years. However, the drive components and high-voltage batteries used for these electric vehicles or the like require special thermal management, and at the same time, it is necessary to secure cooling/heating performance for the internal of the vehicle.

In the case of a conventional vehicle, especially heating, it is not necessary to consider power consumption because of utilizing waste heat through the internal combustion engine of the vehicle. However, in the case of a recent electric vehicle or the like, power consumption may be considered to increase energy efficiency and driving distance.

However, there is a problem in that reduction of the power consumption is not sufficiently considered even in such a recent electric vehicle since the electric vehicle simply utilizes only several fixed logics to thermally manage the components thereof. For example, various thermal management apparatuses are simply controlled with fixed logics based on the difference between a current temperature and a desired temperature when a high-voltage battery reaches a certain temperature or higher. However, the thermal management apparatuses may be unnecessarily operated according to the disturbance such as vehicle speed or ambient temperature, which may lead to a section which is significantly inefficient in terms of energy.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method for controlling a vehicle thermal management apparatus, configured for satisfying a thermal management target for a vehicle component while minimizing power consumption by determining a required amount of heat exchange through states of a vehicle component and a disturbance by an optimal control technique and thus controlling a thermal management apparatus, rather than simply controlling the thermal management apparatus according to the temperature of the vehicle component by a fixed method.

In accordance with one aspect of the present invention, a system for controlling a vehicle thermal management apparatus may include a thermal management apparatus having a heat transfer medium, a vehicle component connected to the thermal management apparatus and thermally managed by the thermal management apparatus, a component state unit of collecting a state of the vehicle component, a disturbance collection unit of collecting a state of a disturbance affecting thermal management of the vehicle component, a calculation unit of calculating an amount of heat exchange between the vehicle component and the thermal management apparatus, which is required in the future, based on a past state value of the vehicle component collected through the component state unit and a past state value of the disturbance collected through the disturbance collection unit, and an operation unit of controlling operation of the thermal management apparatus based on the amount of heat exchange determined by the calculation unit.

The thermal management apparatus may include a radiator, a coolant line circulating the radiator and the thermal management apparatus, a water pump for circulating coolant in the coolant line, and a radiation fan for dissipating heat from the radiator, and the operation unit may control operation of the water pump and the radiation fan.

The vehicle component may be a high-voltage battery of a vehicle.

The component state unit may collect a past temperature of the vehicle component.

The disturbance collection unit may collect disturbance data including a past input or output current of the vehicle component.

The disturbance data may further include a past vehicle speed.

The disturbance data may further include a state of charge (SOC) value of a high-voltage battery in the past or an outside air temperature in the past.

The calculation unit may determine a required amount of heat exchange in the future through the following equation:

$$T_b[p+i] = \sum_{j=1}^{m} a_j T_b[p+i-s_j] + \sum_{k=1}^{n} b_k D_k[p+i] + c\dot{Q}_{cool}[p+i]$$

where p: each point of time in time (e.g., a current point of time: p=0, a next point of time: p=1), p+i: a future point of time away from each point of time p in time by i in the future, i=1,2, . . . , $N_i$, $s_j$=1,2, . . . , $N_j$, $a_j$, $b_k$, c: characteristic constants of the vehicle component (coefficients in the equation for determining the required amount of heat exchange), $T_b[p+i]$: a predicted future temperature of the vehicle component, $T_b[p+i-s_j]$: a past temperature of the vehicle component, $D_k[p+i]$: a predicted future value of the disturbance, and $\dot{Q}_{cool}[p+i]$: a future required amount of heat exchange.

The predicted future value of the disturbance may be an average of a plurality of types of past disturbance data.

The coefficients in the equation for determining the required amount of heat exchange, $a_j$, $b_k$, and c, may be derived by substituting a plurality of sets of test data.

The operation unit may control the water pump and the radiation fan by selecting a desired flow rate of the water pump and a desired rotation speed of the radiation fan, at which an increase in power consumption is minimized, through a result of comparison of a required amount of heat exchange in the future with a current amount of heat exchange and a data map in which the flow rate of the water pump and the rotation speed of the radiation fan are input and the power consumption is output.

The operation unit may include a plurality of data maps corresponding to vehicle speeds, and may select a desired flow rate of the water pump and a desired rotation speed of the radiation fan using data map corresponding to the current one of the vehicle speeds.

In accordance with another aspect of the present invention, a method of controlling a thermal management apparatus using the system for controlling a vehicle thermal management apparatus according to the above aspect may include collecting the state of the vehicle component in the component state unit, collecting the state of the disturbance affecting the thermal management of the vehicle component in the disturbance collection unit, determining the amount of heat exchange between the vehicle component and the thermal management apparatus, which is required in the future, based on the past state value of the vehicle component and the past state value of the disturbance in the calculation unit, and controlling the operation of the thermal management apparatus in the operation unit based on the amount of heat exchange determined by the calculation unit.

As apparent from the above description, according to the system and method for controlling a vehicle thermal management apparatus, it is possible to satisfy the thermal management target for the vehicle component while minimizing power consumption by determining a required amount of heat exchange through the states of the vehicle component and disturbance by an optimal control technique and thus to control the thermal management apparatus, rather than simply controlling the thermal management apparatus according to the temperature of the vehicle component by a fixed method.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 illustrates a data map of the system for controlling a vehicle thermal management apparatus according to the exemplary embodiment of the present invention;

FIG. 6 is a flowchart illustrating a method of controlling a vehicle thermal management apparatus according to an exemplary embodiment of the present invention.

Figure 1:
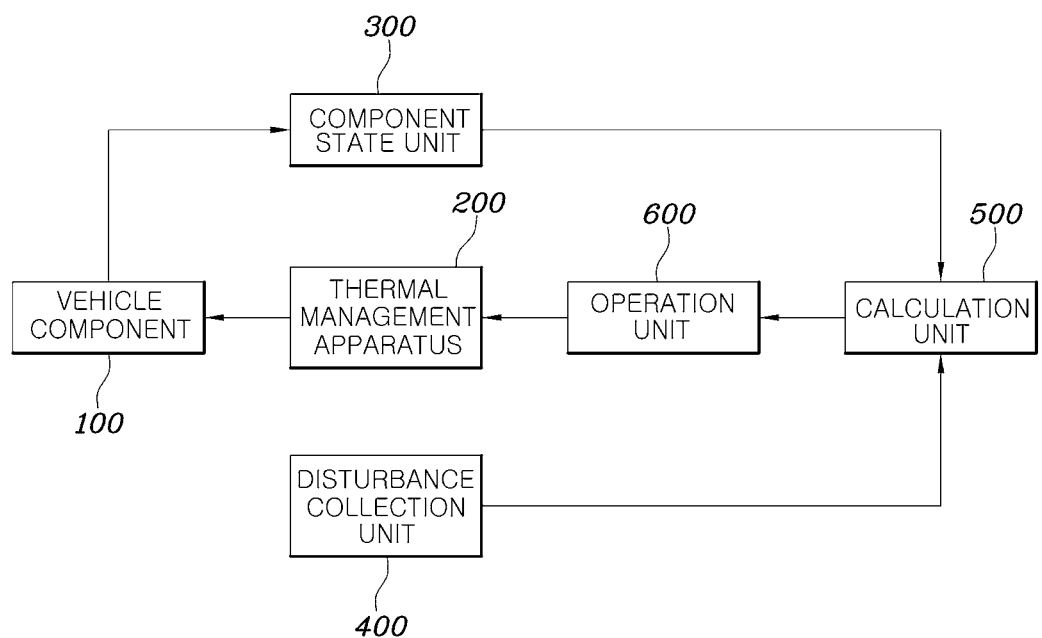
FIG. 1 is a block diagram illustrating a system for controlling a vehicle thermal management apparatus according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
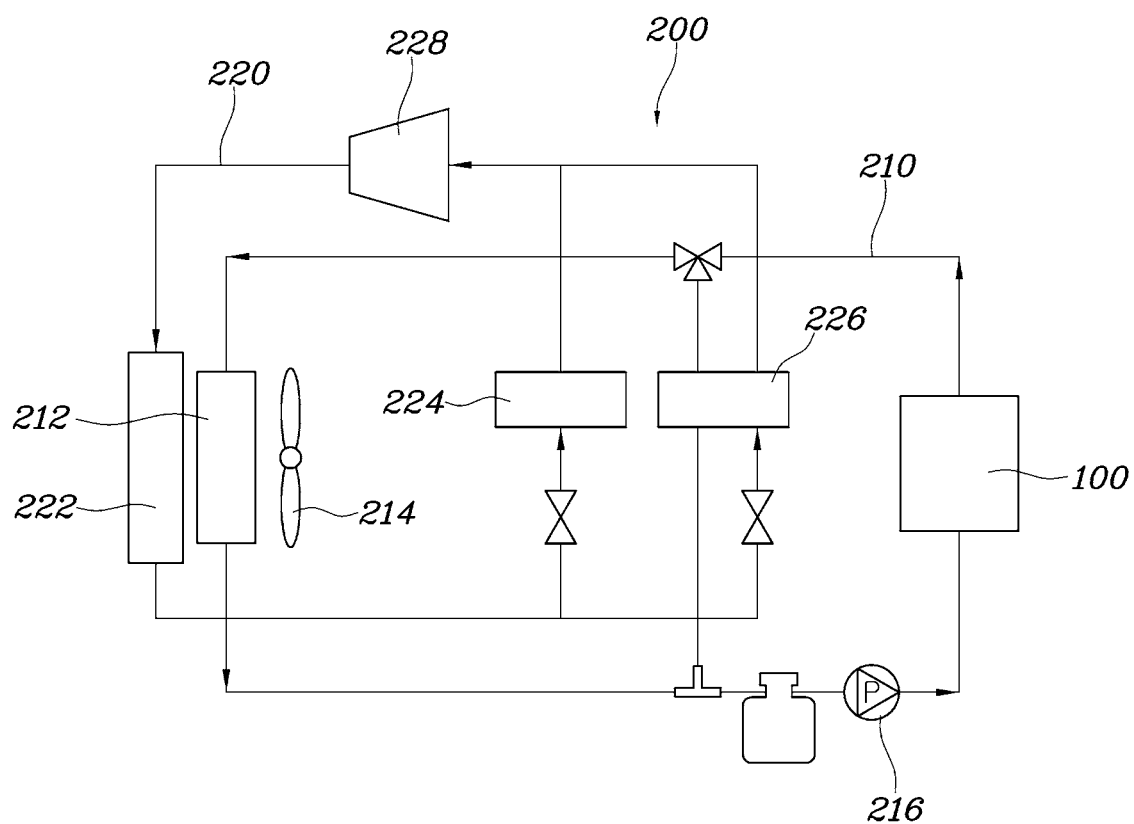
FIG. 2 is a diagram illustrating a thermal management apparatus in the system for controlling a vehicle thermal management apparatus according to the exemplary embodiment of the present invention.
Figure 4:
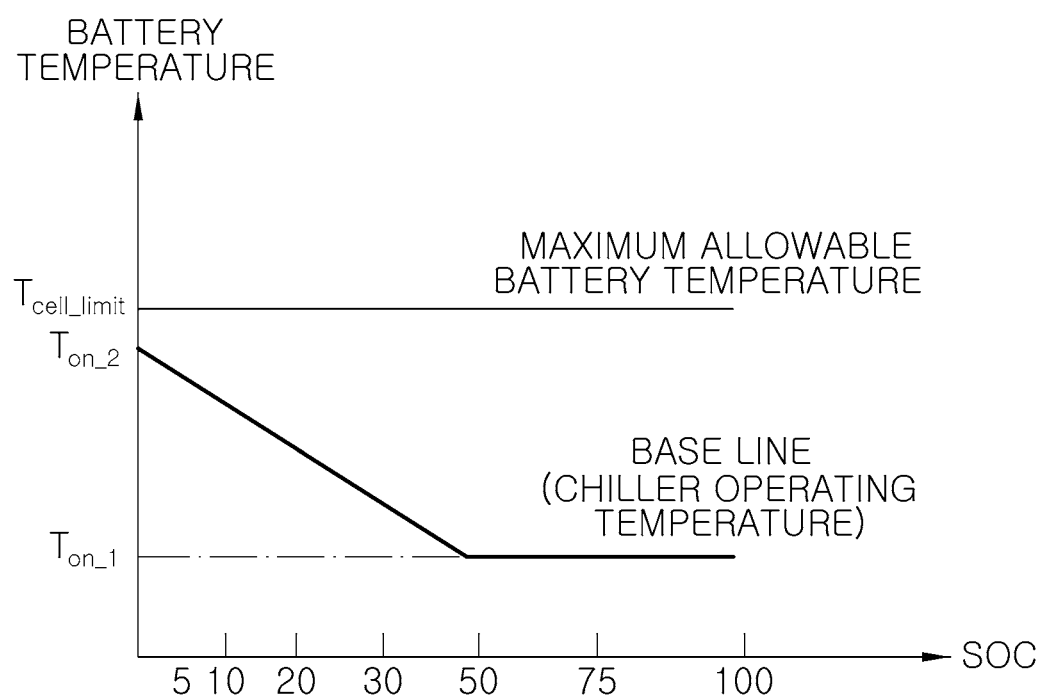
FIG. 4 and FIG. 5 are graphs illustrating a control strategy of the thermal management apparatus according to the scenario of the system for controlling a vehicle thermal management apparatus according to the exemplary embodiment of the present invention.
Figure 5:
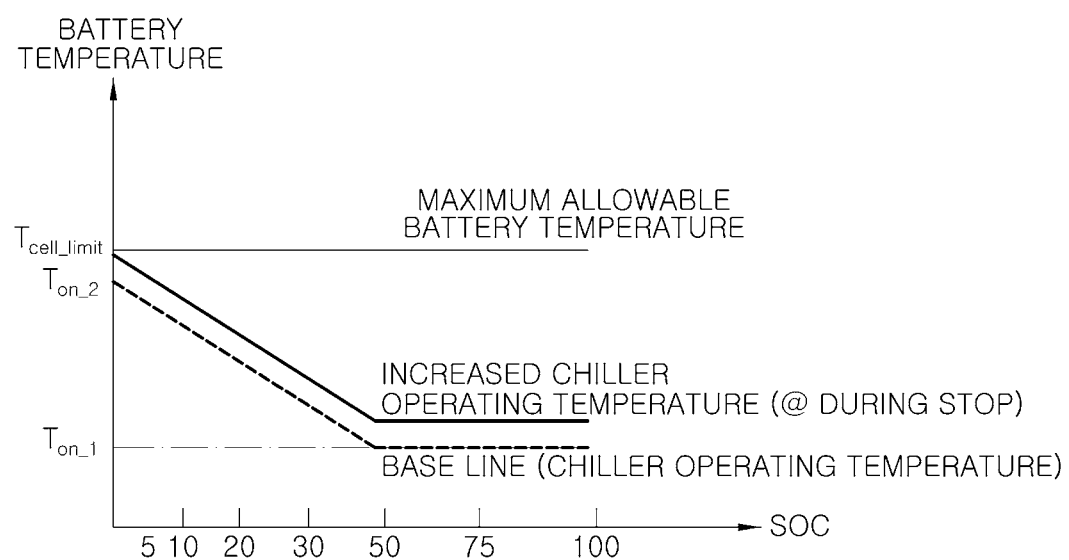

FIG. 1 is a block diagram illustrating a system for controlling a vehicle thermal management apparatus according to an exemplary embodiment of the present invention. FIG. 2 is a diagram illustrating a thermal management apparatus in the system for controlling a vehicle thermal management apparatus according to the exemplary embodiment of the present invention. FIG. 3 illustrates a data map of the system for controlling a vehicle thermal management apparatus according to the exemplary embodiment of the present invention. FIG. 4 and FIG. 5 are graphs illustrating a control strategy of the thermal management apparatus according to the scenario of the system for controlling a vehicle thermal management apparatus according to the exemplary embodiment of the present invention. FIG. 6 is a flowchart illustrating a method of controlling a vehicle thermal management apparatus according to an exemplary embodiment of the present invention.

FIG. 1 is a block diagram illustrating a system for controlling a vehicle thermal management apparatus according to an exemplary embodiment of the present invention. The system for controlling a vehicle thermal management apparatus according to an exemplary embodiment of the present invention includes a thermal management apparatus 200 having a heat transfer medium, a vehicle component 100 thermally managed by the thermal management apparatus 200, a component state unit 300 for collecting a state of the vehicle component 100, a disturbance collection unit 400 for collecting a state of a disturbance affecting thermal management of the vehicle component 100, a calculation unit 500 for determining an amount of heat exchange between the vehicle component 100 and the thermal management apparatus 200, which is required in the future, based on the past state value of the vehicle component 100 collected through the component state unit 300 and the past state value of the disturbance collected through the disturbance collection unit 400, and an operation unit 600 for controlling the operation of the thermal management apparatus 200 based on the amount of heat exchange determined by the calculation unit 500.

Conventionally, when the vehicle component 100 such as a high-voltage battery reaches a certain temperature or higher, it is controlled by a fixed logic. Hence, there is a problem in that energy is excessively consumed since an air conditioner compressor is unnecessarily operated. In contrast, the present invention is advantageous in that the thermal management of the vehicle component 100 can be performed without any problem while using minimum energy by examining the history of the disturbance as well as the history of the target vehicle component 100 to predict an optimal required amount of heat exchange and thus controlling the thermal management apparatus 200.

To the present end, the thermal management apparatus 200 in the system for controlling a vehicle thermal management apparatus of the present invention has a heat transfer medium to allow the vehicle component 100 to be thermally managed. The thermal management apparatus 200 includes a radiator, a coolant line circulating the radiator and the thermal management apparatus 200, a water pump for circulating coolant in the coolant line, and a radiation fan for dissipating heat from the radiator.

The vehicle component 100 is thermally managed by the thermal management apparatus 200. A representative example of the vehicle component 100 may include a high-voltage battery of the vehicle. Since the high-voltage battery exhibits the highest efficiency and service life in a specific temperature range, it is very important to prevent overheating over a certain temperature.

Furthermore, the component state unit 300 collects the state of the vehicle component 100. That is, the component state unit 300 is configured to track the past and current states of the vehicle component 100 to store them in a memory. The disturbance collection unit 400 collects the state of a disturbance affecting the thermal management of the vehicle component 100. The past and current states of the disturbance are also stored in the memory on a cycle.

The calculation unit 500 determines a future required amount of heat exchange between the vehicle component 100 and the thermal management apparatus 200 based on the past state value of the vehicle component 100 collected through the component state unit 300 and the past state value of the disturbance collected through the disturbance collection unit 400. The operation unit 600 controls the operation of the thermal management apparatus 200 based on the amount of heat exchange determined by the calculation unit 500.

In detail, the component state unit 300 may collect the past temperature of the vehicle component 100. This is because the future temperature change of the vehicle component 100 may be predicted since it is affected to some extent by the immediately previous temperature change of the vehicle component 100. The disturbance collection unit 400 may collect disturbance data including the past input or output current of the vehicle component 100. Since the high-voltage battery mostly follows a past change of output current, a future current input/output may be predicted to some extent through the past change of current. Furthermore, the disturbance data may further include a vehicle speed in the past since the vehicle speed may make a change in the performance of the radiator. The disturbance data may further include a state of charge (SOC) value of the high-voltage battery in the past or an outside air temperature in the past since the state of charge may make a change in the future temperature of the battery and the outside air temperature may affect the future performance of the radiator.

The calculation unit 500 may determine a required amount of heat exchange in the future based on these types of data through the following equation:

$$T_b[p+i] = \sum_{j=1}^{m} a_j T_b[p+i-s_j] + \sum_{k=1}^{n} b_k D_k[p+i] + c \dot{Q}_{cool}[p+i]$$

where p: each point of time in time (e.g., a current point of time: p=0, a next point of time: p=1), p+i: a future point of time away from each point of time p in time by i in the future, i=1,2, ..., $N_i$, $s_j$=1,2, ..., $N_j$, $a_j$, $b_k$, c: characteristic constants of the vehicle component (coefficients in the equation for determining the required amount of heat exchange), $T_b[p+i]$: a predicted future temperature of the vehicle component, $T_b[p+i-s_j]$: a past temperature of the vehicle component, $D_k[p+i]$: a predicted future value of the disturbance, and $\dot{Q}_{cool}[p+i]$: a future required amount of heat exchange, and m and n are integer numbers.

The above equation shows that the predicted temperature value of the high-voltage battery may be indicated by the past temperature change of the high-voltage battery, the change of the disturbance, and the amount of radiation required in the high-voltage battery. The coefficients in the equation for determining the required amount of heat exchange, $a_j$, $b_k$, and c, may be derived by substituting a plurality of sets of test data. The related mathematical technique will be introduced as follows. A series of data may be expressed as follows.

$$y(t) = \sum_{i=1}^{n} a_i x_i(t) = P(t)^T A$$

$$P(t) = [x_1(t) x_2(t) \ldots x_n(t)]^T$$

$$A = [a_1 \, a_2 \, \ldots \, a_n]^T.$$

The error is expressed as follows, and each coefficient value which minimizes the error is obtained by setting the differential value to 0 (zero) for the error.

$$e^2 = \left( \sum_{i=1}^{n} a_i x_i(t) - y(t) \right)^2 \to \frac{\partial e^2}{\partial a_i} = 0$$

In brief, the vector of coefficients A is expressed as follows.

$$A = \left[ \sum_{t=1}^{N} P(t) P(t)^T \right]^{-1} \sum_{t=1}^{N} P(t) y(t)$$

A specific example of the above equation may include the following equation. The following equation is to determine a required amount of heat exchange for ith in the future at the current point of time (p=0).

$$T_b[i] = a_1 T_b\left[i - \frac{\tau}{2}\right] + a_2 T_b[i - \tau] + a_3 I_b[i] + a_4 V_{kph}[i] + a_5 \dot{Q}_{cool}[i]$$

$$i = 1, 2, \ldots N_h$$

As described above, the predicted temperature value of the high-voltage battery may be indicated by a past battery temperature value by time constant $\tau$, a past battery temperature value by half time constant $\tau/2$, a past output current value Ib and a past vehicle speed value $V_{kph}$ as disturbance, and a future required amount of radiation. These determined values may be scaled by multiplying appropriate coefficients a1, a2, a3, and the like.

To complete the above equation, it is necessary to find the precise value of the coefficient. It is possible to obtain the coefficient values by solving the equation through substitution of a plurality of sets of actual data tested in a laboratory or the like. For example, the coefficient of current a3 is positive, which, in the case of current, affects the future temperature as an increase factor. The coefficient of a vehicle speed a4 is negative, which is configured as a factor of decrease in temperature, and a5 is also negative because the temperature of the battery decreases as the amount of radiation increases.

Furthermore, the predicted future value of the disturbance may be an average of a plurality of types of past disturbance data. That is, the average of the values measured on a cycle for a certain time period in the past is determined and substituted into the equation. The predicted future value of the disturbance may be determined by the state values of preceding vehicles in an inter-vehicle communication connection or connected environment. If it is not such an environment, the predicted future value of the disturbance is a value continuously changed over time due to the characteristics of the disturbance. Therefore, it is possible to mathematically determine the predicted future value of the disturbance by an average or a slope using a plurality of types of past disturbance data. This may be expressed by the following equation.

$$d_k[i] = (d_k(i-1) + d_k(i-2) + \ldots + d_k(i-N_d))/N_d$$

As described above, it is necessary to reflect a past value by time constant for the past temperature value of the high-voltage battery as the vehicle component, and in a case of a disturbance current or a vehicle speed, the past average value for a certain time period may be reflected for the disturbance such as an electric current or a vehicle speed.

When these determined values are substituted, the predicted temperature of the high-voltage battery and the required amount of heat exchange become unknown values. Since these two unknown values are related to each other, an optimal solution may be obtained using a linear program or a quadratic program. The above equation relating to the required amount of heat exchange may be expressed by the quadratic program as follows. First, the following conditions are defined.

$$\text{err}[i] = T_{ref}[i] - T_{bat}[i]$$

$$\dot{Q}_{cool}[i] = UA(T_{bat}[i] - T_{cool}[i])$$

Where UA: Heat Transfer Coefficient

In the above conditions, the error value is expressed by the difference between the desired temperature $T_{ref}$ and the current temperature $T_{bat}$ of the battery, and the amount of radiation is expressed by the difference between the current temperature $T_{bat}$ and the coolant temperature $T_{cool}$. Substituting the above conditions into the equation for the required amount of heat exchange is as follows.

$$a_5 \dot{Q}_{cool}[i] + \text{err}[i] = T_{ref} - a_1 T_b\left[i - \frac{\tau}{2}\right] - a_2 T_b[i - \tau] - a_3 I_b[i] - a_4 V_{kph}[i]$$

The above equation may be used to derive the predicted temperature of the battery and the required amount of heat exchange, which may balance the cooling performance and the energy consumption through a cost function. The following shows the definition for the cost function J.

$$j[i] = \dot{Q}_{cool}[i] + \beta(\text{err}[i])^2$$

$$x[i] = [\dot{Q}_{cool}[i] \text{err}[i]]^T = [x_{i,1}\, x_{i,2}]^T$$

Where $\beta$: Weights on the degree of reflection of the error value err[i]

The following equation refers to a final quadratic program and constraints for a series of future points of time. This is expressed in a final matrix form by solving i in the future range from 1 to $N_h$ in the above equation.

$$\min J = f^T X + \tfrac{1}{2} X^T H X$$

$$A_{eq} X = b_{eq}$$

$$X_b \leq X \leq X_u$$

Here, X, f, H, $A_{eq}$, and $b_{eq}$ are as follows.

$$X = \begin{bmatrix} x_{1,1} \\ x_{1,2} \\ x_{2,1} \\ x_{2,2} \\ \ldots \\ x_{N_h,1} \\ x_{N_h,2} \end{bmatrix},\; f = \begin{bmatrix} 1 \\ 0 \\ 1 \\ 0 \\ \ldots \\ 1 \\ 0 \end{bmatrix},\; H = \begin{bmatrix} 0 & 0 & 0 & & 0 & 0 & 0 \\ 0 & 2\beta & 0 & & 0 & 0 & 0 \\ 0 & 0 & & & & 0 & 0 \\ & & & \ldots & & & \\ 0 & 0 & & & & 0 & 0 \\ 0 & 0 & 0 & & 0 & 0 & 0 \\ 0 & 0 & 0 & & 0 & 0 & 2\beta \end{bmatrix}$$

$$A_{eq} = \begin{bmatrix} c & 1 & 0 & & 0 & & \\ & & & \ldots & & & \\ 0 & & 0 & c & 1 & & \\ & \ldots & & & \ldots & & \ldots \\ 0 & & 0 & 0 & & 0 & 0 \\ 0 & & 0 & 0 & & c & 1 \end{bmatrix}$$

where c: characteristic constants of the vehicle component (coefficients in the equation for determining the required amount of heat exchange)

$$b_{eq} = \begin{bmatrix} T_{ref} - a_1 T_b\left[1 - \frac{\tau}{2}\right] - a_2 T_b[1 - \tau] - a_3 I_b[1] - a_4 V_{kph}[1] \\ T_{ref} - a_1 T_b\left[2 - \frac{\tau}{2}\right] - a_2 T_b[2 - \tau] - a_3 I_b[2] - a_4 V_{kph}[2] \\ T_{ref} - a_1 T_b\left[N_h - \frac{\tau}{2}\right] - a_2 T_b[N_h - \tau] - a_3 I_b[N_h] - a_4 V_{kph}[N_h] \end{bmatrix}$$

By analyzing the cost function through the quadratic program to obtain a solution, it is possible to obtain the required amount of heat exchange that satisfies both performance and energy efficiency in balance. The operation unit 600 may control the water pump and the radiation fan by selecting a desired flow rate of the water pump and a desired rotation speed of the radiation fan, at which an increase in power consumption is minimized, through a result of comparison of a required amount of heat exchange in the future with a current amount of heat exchange and a data map in which the flow rate of the water pump and the rotation speed of the radiation fan are input and the power consumption is output.

If the required amount of heat exchange, namely, the required amount of radiation is smaller than the current amount of radiation, this is not a problem, but if it is larger, additional dissipation of heat will be required. In the instant case, it is necessary to additionally operate the water pump and the radiation fan to increase dissipation of heat from the coolant line.

FIG. 2 is a diagram illustrating the thermal management apparatus 200 in the system for controlling a vehicle thermal management apparatus according to the exemplary embodiment of the present invention. The thermal management apparatus 200 includes a coolant line 210 and a refrigerant line 220. When low dissipation of heat is required, a battery 100 is cooled by the coolant line. The coolant line is provided with a water pump 216, a radiator 212, and a radiation fan 214. The refrigerant line is provided with a condenser 222, a chiller 226, an evaporator 224, and a compressor 228, and the chiller 226 selectively exchanges heat with the refrigerant line 220.

FIG. 3 illustrates the data map of the system for controlling a vehicle thermal management apparatus according to the exemplary embodiment of the present invention. In the data map, the flow rate of the water pump and the rotation speed of the radiation fan are input and the power consumption is output. That is, it is necessary to increase the flow rate of the water pump or the rotation speed of the radiation fan when the required amount of radiation is greater than the current amount of radiation so that additional dissipation of heat is required. The data map shows whether which of these two operations consumes more power. That is, when additional cooling is required in the first section of the data map of FIG. 3, the movement to the second or third section is possible. First, a portion with low power consumption is selected and controlled to determine a required amount of radiation again, and if further cooling is required, a portion is selected and controlled again in the data map. Through the present process, it is possible to obtain a solution that satisfies the required amount of radiation while minimizing power consumption.

Of course, if the required amount of radiation may not be ensured even though the water pump or the radiation fan is fully operated, the compressor may be operated to use the refrigerant line from the beginning.

The operation unit 600 includes a plurality of data maps corresponding to vehicle speeds, and may select a desired flow rate of the water pump and a desired rotation speed of the radiation fan using the data map corresponding to the current vehicle speed. That is, since the vehicle speed is also an important disturbance factor, more precise control may be performed by reflecting the vehicle speed. To the present end, a data map is provided for each vehicle speed, and the data map corresponding to the vehicle speed at that point of time is utilized.

FIG. 4 and FIG. 5 are graphs illustrating a control strategy of the thermal management apparatus 200 according to the scenario of the system for controlling a vehicle thermal management apparatus according to the exemplary embodiment of the present invention. Furthermore, control may be performed in a different manner depending on the state of charge (SOC) value of the battery. If the state of charge is insufficient when the chiller and the compressor are operated, the operating temperature of the battery that activates the chiller may be adjusted up to reduce the charge consumption of the battery as much as possible. Furthermore, the power consumption of the battery is expected to be small in the area where the vehicle stagnates, in which case the operating temperature of the battery that activates the chiller may be adjusted down to increase the efficiency of the battery and protect it from deterioration.

FIG. 6 is a flowchart illustrating a method of controlling a vehicle thermal management apparatus according to an exemplary embodiment of the present invention. The method of controlling a thermal management apparatus using the system for controlling a vehicle thermal management apparatus of the present invention includes a step of collecting the state of the vehicle component in the component state unit (S100), a step of collecting the state of the disturbance affecting the thermal management of the vehicle component in the disturbance collection unit (S200), a step of determining the amount of heat exchange between the vehicle component and the thermal management apparatus, which is required in the future, based on the past state value of the vehicle component and the past state value of the disturbance in the calculation unit (S300), and a step of controlling the operation of the thermal management apparatus in the operation unit based on the amount of heat exchange determined by the calculation unit.

According to the system and method for controlling a vehicle thermal management apparatus, it is possible to satisfy the thermal management target for the vehicle component while minimizing power consumption by determining a required amount of heat exchange through the states of the vehicle component and disturbance by an optimal control technique and thus to control the thermal management apparatus, rather than simply controlling the thermal management apparatus according to the temperature of the vehicle component by a fixed method.

It is possible to improve the driving distance on single charge (electricity efficiency) by reducing the power consumption for cooling and conditioning and improve the thermal durability of components through active component temperature management. Furthermore, the present invention has an advantage of ensuring the control algorithm for vehicle thermal management and thus implementing the integrated thermal management control strategy of the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling a thermal management apparatus, the system comprising:
the thermal management apparatus having a heat transfer medium;
a vehicle component connected to the thermal management apparatus and thermally managed by the thermal management apparatus;
a component state unit of collecting a state of the vehicle component;
a disturbance collection unit of collecting a state of a disturbance affecting thermal management of the vehicle component;
a calculation unit of determining an amount of heat exchange between the vehicle component and the thermal management apparatus, which is required in a predetermined time subsequent to a current time, based on a first state value of the vehicle component collected for a first past time from the current time through the component state unit and a second state value of the disturbance collected for a second past time from the current time through the disturbance collection unit; and
an operation unit of controlling operation of the thermal management apparatus based on the amount of heat exchange determined by the calculation unit.

2. The system according to claim 1,
wherein the thermal management apparatus includes a radiator, a coolant line circulating the radiator and the thermal management apparatus, a water pump for circulating coolant in the coolant line, and a radiation fan for dissipating heat from the radiator, and
wherein the operation unit controls operation of the water pump and the radiation fan.

3. The system according to claim 1, wherein the vehicle component is a battery of a vehicle.

4. The system according to claim 1, wherein the component state unit is configured to collect a temperature of the vehicle component for a third past time from the current time.

5. The system according to claim 1, wherein the disturbance collection unit is configured to collect disturbance data including an input or output current of the vehicle component for a fourth past time from the current time.

6. The system according to claim 5, wherein the disturbance data further includes a vehicle speed collected for a fifth past time from the current time.

7. The system according to claim 5, wherein the disturbance data further includes a state of charge (SOC) value of a battery collected for a sixth past time from the current time or an outside air temperature collected for a seventh past time from the current time.

8. The system according to claim 1, wherein the calculation unit determines the amount of heat exchange in the predetermined time subsequent to the current time through the following equation:

$$T_b[p+i] = \sum_{j=1}^{m} a_j T_b[p+i-s_j] + \sum_{k=1}^{n} b_k D_k[p+i] + c\dot{Q}_{cool}[p+i]$$

where p: each point of time in time (e.g., a current point of time: p=0, a next point of time: p=1),
p+i: a future point of time away from each point of time p in time by i in the future,
i=1,2, . . . , $N_i$, $s_j$=1,2, . . . , $N_j$,
$a_j$, $b_k$, c: characteristic constants of the vehicle component (coefficients in the equation for determining the amount of heat exchange),
$T_b[p+i]$: a predicted future temperature of the vehicle component,
$T_b[p+i-s_j]$: a past temperature of the vehicle component,
$D_k[p+i]$: a predicted future value of the disturbance, and
$\dot{Q}_{cool}[p+i]$: a future required amount of heat exchange.

9. The system according to claim 8,
wherein the predicted future value of the disturbance is an average of a plurality of types of disturbance data.

10. The system according to claim 8,
wherein the coefficients in the equation for determining the amount of heat exchange, $a_j$, $b_k$, and c, are derived by substituting a plurality of sets of test data.

11. The system according to claim 2,
wherein the operation unit is configured to control the water pump and the radiation fan by selecting a target flow rate of the water pump and a target rotation speed of the radiation fan, at which an increase in power consumption is minimized, through a result of comparison of the amount of heat exchange in the predetermined time subsequent to the current time with a current amount of heat exchange and a data map in which the target flow rate of the water pump and the target rotation speed of the radiation fan are input and the power consumption is output.

12. The system according to claim 11,
wherein the operation unit includes a plurality of data maps corresponding to vehicle speeds, and selects the target flow rate of the water pump and the target rotation speed of the radiation fan using a data map corresponding to a current one of the vehicle speeds.

13. A method of controlling the thermal management apparatus using the system for controlling the thermal management apparatus according to claim 1, the method including:
collecting, by the component state unit, the state of the vehicle component;
collecting, by the disturbance collection unit, the state of the disturbance affecting the thermal management of the vehicle component;
determining, by the calculation unit, the amount of heat exchange between the vehicle component and the thermal management apparatus, which is required in the predetermined time subsequent to the current time, based on the first state value of the vehicle component and the second state value of the disturbance; and
controlling, by the operation unit, the operation of the thermal management apparatus based on the amount of heat exchange determined by the calculation unit.

* * * * *